(12) United States Patent
Wang et al.

(10) Patent No.: US 12,438,849 B2
(45) Date of Patent: Oct. 7, 2025

(54) FACE ANONYMIZATION USING A GENERATIVE ADVERSARIAL NETWORK

(71) Applicants: Elektrobit Automotive GmbH, Erlangen (DE); NANYANG TECHNOLOGICAL UNIVERSITY, Singapore (SG)

(72) Inventors: Yi Estelle Wang, Singapore (SG); Liming Zhai, Singapore (SG); Qing Guo, Singapore (SG); Jeremy Dahan, Fair Oaks, CA (US)

(73) Assignees: Elektrobit Automotive GmbH, Erlangen (DE); NANYANG TECHNOLOGICAL UNIVERSITY, Singapore (SG)

( * ) Notice: Subject to any disclaimer, the term of this patent is extended or adjusted under 35 U.S.C. 154(b) by 259 days.

(21) Appl. No.: 18/131,147

(22) Filed: Apr. 5, 2023

(65) Prior Publication Data

US 2023/0328039 A1    Oct. 12, 2023

(30) Foreign Application Priority Data

Apr. 6, 2022    (EP) .................................... 22166968

(51) Int. Cl.
*H04L 9/40*    (2022.01)
*G06F 21/62*   (2013.01)
(Continued)

(52) U.S. Cl.
CPC ...... *H04L 63/0421* (2013.01); *G06F 21/6254* (2013.01); *G06T 7/0002* (2013.01); *G06T 11/60* (2013.01); *G06T 2207/20081* (2013.01); *G06T 2207/30168* (2013.01); *G06T 2207/30201* (2013.01); *G06T 2207/30252* (2013.01)

(58) Field of Classification Search
CPC ............. H04L 63/0421; G06F 21/6254; G06T 7/0002; G06T 11/60; G06T 2207/20081; G06T 2207/30168; G06T 2207/30201; G06T 2207/30252
See application file for complete search history.

(56) References Cited

U.S. PATENT DOCUMENTS 11,244,248 B1 *   2/2022  Kim ..................... G06N 3/084
2023/0027783 A1 * 1/2023  Kuta ................... G06F 21/6254
(Continued)

FOREIGN PATENT DOCUMENTS

| CN | 111242837 A     | 6/2020  |
| DE | 102020115697 A1 | 12/2021 |
| WO | 2020205655 A1   | 10/2020 |

OTHER PUBLICATIONS

Maxim Maximov et al. "CIAGAN: Conditional Identity Anonymization Generative Adversarial Networks", 2020, 2020 IEEE/CVF Conference on Computer Vision and Pattern Recognition (CVPR), IEEE.
(Continued)

*Primary Examiner* — Kristie D Shingles

(57) ABSTRACT

A generative adversarial network performs face anonymization. In a first step, an input image showing a face to be anonymized is received. Furthermore, an input vector with control data for face anonymization is received. The generative adversarial network then generates an output image in which the face is anonymized in accordance with the control data of the input vector.

12 Claims, 5 Drawing Sheets

(51) Int. Cl.
   *G06T 7/00*      (2017.01)
   *G06T 11/60*     (2006.01)

(56)            References Cited

U.S. PATENT DOCUMENTS

2023/0112302 A1* 4/2023 Marks ................... G06T 13/80
                                                     345/419
2024/0348747 A1* 10/2024 Chatterjee ............... H04N 7/15

OTHER PUBLICATIONS

Saheb Chhabra et al. "Anonymizing k-Facial Attributes via Adversarial Perturbations", IJCAI'18: Proceedings of the 27th International Joint Conference on Artificial Intelligence Jul. 2018 pp. 656-662.
Qianru Sun et al. "A Hybrid Model for Identity Obfuscation by Face Replacement", Proceedings of the European Conference on Computer Vision (ECCV). 2018.
Yonghyun Jeong et al. "FICGAN: Facial Identity Controllable GAN for De-identification", arxiv.org, Cornell University Library, 201 OLIN Library Cornell University Ithaca, NY 14853; Oct. 2, 2021 (Oct. 2, 2021), XP091070229.
Qianru Sun et al. "Natural and Effective Obfuscation by Head Inpainting", Computer Vision Foundation.
Hakon Hukkelas et al. "DeepPrivacy: A Generative Adversarial Network for Face Anonymization", Springer Nature Switzerland AG 2019, G. Bebis et al. (Eds.): ISVC 2019, LNCS 11844, pp. 565-578, 2019. https://doi.org/10.1007/978-3-030-33720-9_44.
Extended Search Report dated Sep. 6, 2022 from corresponding European patent application No. 22166968.2.

* cited by examiner

FACE ANONYMIZATION USING A GENERATIVE ADVERSARIAL NETWORK

BACKGROUND

The present invention is related to a method, a computer program code, and an apparatus for face anonymization. The invention is further directed towards a generative adversarial network for use in such a method or apparatus. The invention is also directed towards an image processing system, which makes use of such a method or apparatus, and to a motor vehicle comprising such an image processing system.

There is an ever-increasing number of cameras that take photos or videos of public spaces, such as surveillance cameras, cameras incorporated in smartphones or other electronic devices, or cameras comprised in motor vehicles, for example for providing input data for autonomous driving functions or driver assistance functions.

Images and video recordings captured by such cameras will often include people, either intentionally or unintentionally. In case those people have not given permission to be shown in the image or video recording, their personal rights and privacy may be violated. This is in particular the case if they may be identified based on characteristics visible in the image or video recording, e.g., if faces are recognizable.

Especially for the development of new autonomous driving functions, manufactures and suppliers need to rely on video images from real road traffic. However, since the European General Data Protection Regulation (GDPR) came into force in May 2018, anyone who uses such video recordings to train their algorithms may be in breach of data protection.

In order to address the above issues, face anonymization may be used. Simple solutions for face anonymization make use of pixelization, blurring or masking the faces. Unfortunately, these solutions cause serious distortions of the original facial images and greatly affect the visual effect. Furthermore, they disturb subsequent vision tasks, such as face detection.

A more complex solution for face anonymization is described in the article by S. Chhabra et al.: "Anonymizing k-Facial Attributes via Adversarial Perturbations" (https://arxiv.org/abs/1805.09380). The article describes a solution for anonymizing facial attributes, which is based on adversarial perturbation and embeds imperceptible noise in an image such that attribute prediction algorithm for the selected attribute yields an incorrect classification result.

Recent solutions for face anonymization make use of Generative Adversarial Networks (GANs) for synthesizing new faces with modified face identities for given source faces. The faces are blacked out, but face landmarks are extracted from the original image to preserve the structures of the faces. Then the blacked-out faces and the face landmarks are taken as inputs for a GAN to produce new faces with different face identities.

In this regard, the article by Q. Sun et al.: "Natural and Effective Obfuscation by Head Inpainting" (https://arxiv.org/abs/1711.09001), discloses a technique for head inpainting obfuscation. The obfuscation is split into two sub-tasks, namely facial landmark generation from image context for seamless hypothesis of a sensible head pose, and facial landmark conditioned head inpainting.

The article by M. Maximov et al.: "CIAGAN: Conditional Identity Anonymization Generative Adversarial Networks" (https://arxiv.org/abs/2005.09544), describes a framework for face and body anonymization in images and videos. The underlying model is based on conditional generative adversarial networks. Faces are anonymized based on a guiding identity signal provided by a Siamese network.

A drawback of face anonymization using GANs is that the synthetization of the faces is difficult to control or can only be controlled in a coarse-grained manner. As a consequence, the face expression may not be consistent with the posture or gesture of a person, which may interfere with subsequent vision tasks.

In this regard, DE 10 2020 115 697 describes a computer-implemented method for real-time face anonymization. In the method, a variational autoencoder is trained in a two-stage model training to generate anonymized face images from original face images by encoding to and decoding from a low-dimensional latent vector. The original face images differ from the anonymized face images in characteristic features, such as hairstyle, skin color, or other physiological features. However, the facial expressions are essentially preserved, such as the orientation of the face, the direction of the gaze, or the mouth and nose.

It is an object of the present invention to provide an improved solution for face anonymization.

BRIEF SUMMARY

This object is achieved by a method, a computer program code, which implements this method, and by an apparatus according to the respective independent claims. This object is further achieved by a generative adversarial network according, an image processing system, and a motor vehicle according to other claims. The dependent claims include advantageous further developments and improvements of the present principles as described below.

According to a first aspect, a method for face anonymization comprises the steps of:
receiving an input image showing a face to be anonymized;
receiving an input vector with control data for face anonymization; and
generating, by a generative adversarial network, an output image in which the face is anonymized in accordance with the control data of the input vector.

Accordingly, a computer program code comprises instructions, which, when executed by at least one processor, cause the at least one processor to perform the following steps for face anonymization:
receiving an input image showing a face to be anonymized;
receiving an input vector with control data for face anonymization; and
generating, by a generative adversarial network, an output image in which the face is anonymized in accordance with the control data of the input vector.

The term computer has to be understood broadly. In particular, it also includes mobile devices, embedded devices, electronic control units and other processor-based data processing devices.

The computer program code can, for example, be made available for electronic retrieval or stored on a computer-readable storage medium.

According to another aspect, an apparatus for face anonymization comprises a generative adversarial network configured to:
receive an input image showing a face to be anonymized;
receive an input vector with control data for face anonymization; and generate an output image in which the face is anonymized in accordance with the control data of the input vector.

To solve the controllability problem in face anonymization, the described solution makes use of a control vector that enables facial attribute editing. Face identity is determined by the combination of specific characteristics of facial attributes, i.e., the face identity is a high-level semantic representation determined by specific facial attributes. Therefore, altering the facial attributes can change the face identity, e.g., changing the age from old to young or changing the gender from male to female. In order to implement facial attribute editing, a generative adversarial network framework is employed for adaptively changing the facial attributes which most affect the face identity. As the anonymized facial images are produced by editing facial attributes, visually realistic appearances are achieved, i.e., a high visual quality, which is better than the visual quality that can be achieved by generating new faces from face landmarks. The described solution does not require extra memory and extra processing compared to existing solutions using generative adversarial networks. It can be applied to both static images and video recordings.

In an advantageous embodiment, the input vector comprises control data for individual facial attributes. For example, the control data may specify whether a facial attribute shall be modified, kept, or optionally modified. The described solution allows controlling the selection of facial attributes for anonymization as desired. Faces can thus be anonymized flexibly and controllably while leaving specific facial attributes unchanged or changed optionally. In this way, a complete and fine-grained control over the face anonymization is achieved. The facial organs, hair, age, and gender can be controlled for de-identification, not just the facial areas as in existing solutions.

In an advantageous embodiment, the control data further specifies an amount of modification of a facial attribute. Apart from specifying facial attributes to be changed, the described solution further allows flexibly controlling how much a facial attribute shall be changed.

In an advantageous embodiment, the generative adversarial network comprises a generator sub-network, a discriminator sub-network, and an identity classifier sub-network. The three sub-networks work cooperatively to realize the purpose of face anonymization. The generator sub-network is preferably trained to generate new faces with different facial attributes. The discriminator sub-network is preferably trained to evaluate if generated new faces are realistic and natural. The identity classifier sub-network is preferably trained to evaluate if face identities of new faces have been changed. The generator sub-network, the discriminator sub-network and the identity classifier sub-network are trained alternately and compete with each other to achieve balance of optimization. The discriminator sub-network is firstly trained with real images and fake images. The identity classifier sub-network is also trained with real images and fake images, but for a different purpose. The generator sub-network is trained with input real images and initial facial attribute vectors and produces fake images.

In an advantageous embodiment, the generative adversarial network uses an adversarial loss function, a reconstruction loss function, an attribute loss function, and an identity loss function. The adversarial loss encourages the generator sub-network and the discriminator sub-network to compete with each other to increase their learning capacity. The reconstruction loss encourages the generator sub-network to approximate the original face when all facial attributes are preserved. The attribute loss encourages the generator sub-network to produce faces with correct facial attributes. The identity loss encourages the generator sub-network to produce faces with different face identity. As such, the employed loss functions consider more aspects for model training than prior art solutions. They help to simultaneously meet the requirements of face anonymization, generated image quality and anonymization flexibility.

In an advantageous embodiment, the input vector is selected based on an application scenario. As the facial attribute types for anonymization can be individually controlled, they can be selected for a given application scenario in such a way that the anonymization does not affect the intended vision tasks. For example, for fatigue detection in driving scenarios, the state of eyes and mouth should not be changed.

According to another aspect, a generative adversarial network for use in a solution according to the invention comprises a generator sub-network, a discriminator sub-network, and an identity classifier sub-network. As already mentioned above, the generator sub-network, the discriminator sub-network and the identity classifier sub-network are trained alternately and compete with each other to achieve balance of optimization.

Advantageously, a motor vehicle or an electronic device comprises an apparatus according to the invention or is configured to perform a method according to the invention for face anonymization. For example, the motor vehicle may be a car. One use case of the solution is face anonymization for camera images used for autonomous driving. The electronic device may, for example, be a smartphone, a tablet, or a camera with an integrated processor.

Further features of the present invention will become apparent from the following description and the appended claims in conjunction with the figures.

DETAILED DESCRIPTION

Figure 1:
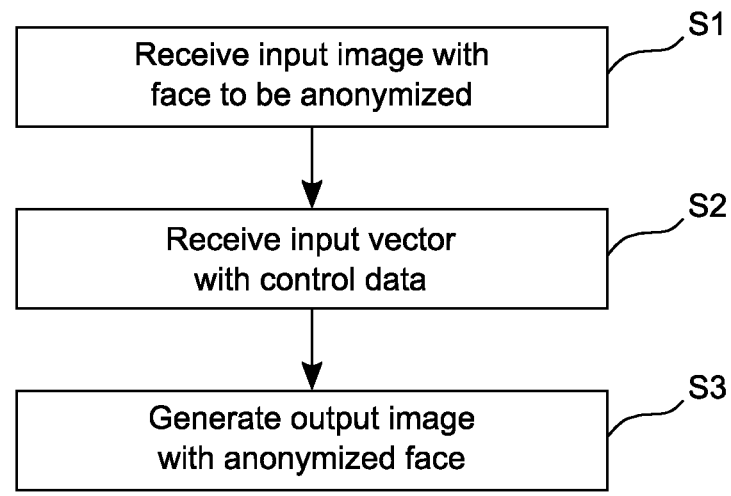
FIG. 1 schematically illustrates a method for face anonymization.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random-access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to the invention for face anonymization. In a first step, an input image showing a face to be anonymized is received S1. Furthermore, an input vector with control data for face anonymization is received S2. For example, the input vector may be selected based on an application scenario. Advantageously, the input vector comprises control data for individual facial attributes. For example, the control data may specify whether a facial attribute shall be modified, kept, or optionally modified. The control data may further specify an amount of modification of a facial attribute. A generative adversarial network then generates S3 an output image in which the face is anonymized in accordance with the control data of the input vector. Advantageously, the generative adversarial network comprises a generator sub-network, a discriminator sub-network, and an identity classifier sub-network. The generator sub-network is preferably trained to generate new faces with different facial attributes. The discriminator sub-network is preferably trained to evaluate if generated new faces are realistic and natural. The identity classifier sub-network is preferably trained to evaluate if face identities of new faces have been changed. The generative adversarial network advantageously uses four loss functions, in particular an adversarial loss function, a reconstruction loss function, an attribute loss function, and an identity loss function.

Figure 2:
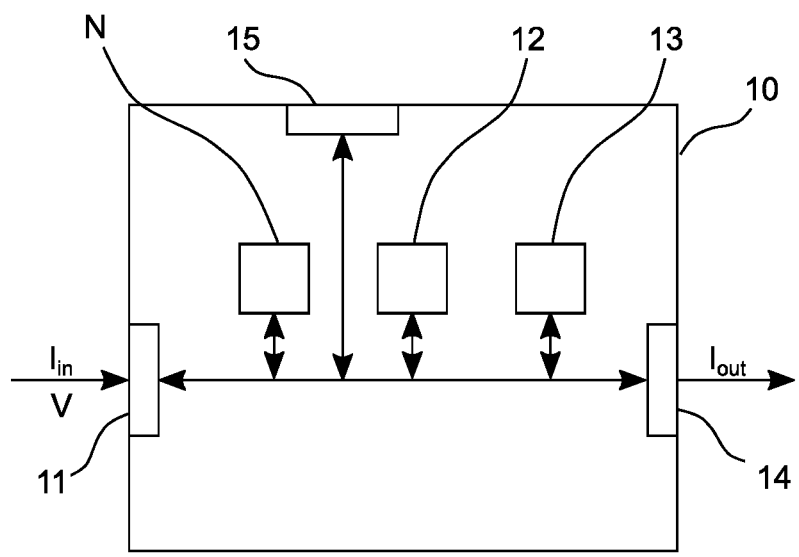
FIG. 2 schematically illustrates a first embodiment of an apparatus for face anonymization.

FIG. 2 schematically illustrates a block diagram of a first embodiment of an apparatus 10 according to the invention for face anonymization. The apparatus 10 has an input 11, via which a generative adversarial network N receives an input image $I_{in}$ in showing a face to be anonymized and an input vector V with control data for face anonymization. Advantageously, the input vector V comprises control data for individual facial attributes. For example, the control data may specify whether a facial attribute shall be modified, kept, or optionally modified. The control data may further specify an amount of modification of a facial attribute. Of course, the input vector V may also stem from an internal source of the apparatus 10. For example, the input vector V may be selected based on an application scenario. The generative adversarial network N then generates an output image $I_{out}$ in which the face is anonymized in accordance with the control data of the input vector V. The output image $I_{out}$ may then be provided to a further processing stage via an output 14 of the apparatus 10. The output 14 may be combined with the input 11 into a single interface. A local storage unit 13 is provided for storing data during processing. Advantageously, the generative adversarial network N comprises a generator sub-network, a discriminator sub-network, and an identity classifier sub-network. The generator sub-network is preferably trained to generate new faces with different facial attributes. The discriminator sub-network is preferably trained to evaluate if generated new faces are realistic and natural. The identity classifier sub-network is preferably trained to evaluate if face identities of new faces have been changed. The generative adversarial network N advantageously uses four loss functions, in particular an adversarial loss function, a reconstruction loss function, an attribute loss function, and an identity loss function.

The generative adversarial network N may be controlled by a control module 12. A user interface 15 may be provided for enabling a user to modify settings of the generative adversarial network N or the control module 12 or for modifying control data of the input vector V. The generative adversarial network N and the control module 12 can be embodied as dedicated hardware units. Of course, they may likewise be fully or partially combined into a single unit or implemented as software running on a processor, e.g., a CPU or a GPU.

Figure 3:
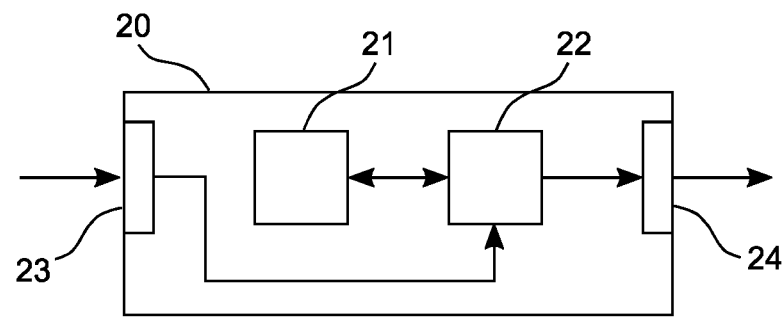
FIG. 3 schematically illustrates a second embodiment of an apparatus for face anonymization.

A block diagram of a second embodiment of an apparatus 20 according to the invention for face anonymization is illustrated in FIG. 3. The apparatus 20 comprises a processing device 22 and a memory device 21. For example, the apparatus 20 may be a computer, an electronic control unit or an embedded system. The memory device 21 has stored instructions that, when executed by the processing device 22, cause the apparatus 20 to perform steps according to one of the described methods. The instructions stored in the memory device 21 thus tangibly embody a program of instructions executable by the processing device 22 to perform program steps as described herein according to the present principles. The apparatus 20 has an input 23 for receiving data. Data generated by the processing device 22 are made available via an output 24. In addition, such data may be stored in the memory device 21. The input 23 and the output 24 may be combined into a single bidirectional interface.

The processing device 22 as used herein may include one or more processing units, such as microprocessors, digital signal processors, or a combination thereof.

The local storage unit 13 and the memory device 21 may include volatile and/or non-volatile memory regions and storage devices such as hard disk drives, optical drives, and/or solid-state memories.

Figure 4:
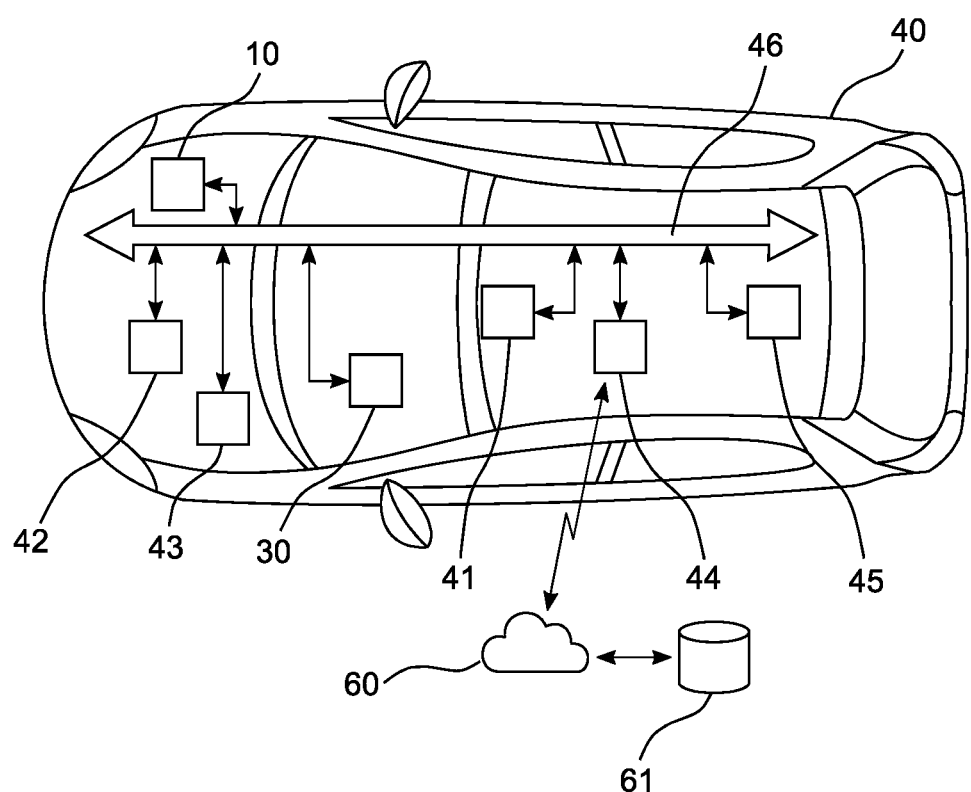
FIG. 4 schematically illustrates a motor vehicle in which a solution according to the invention is implemented.

FIG. 4 schematically shows a motor vehicle 40, in which a solution in accordance with the invention is implemented. In this example, the motor vehicle 40 is a car. The car has a camera 41 and a number of other environment sensors 42, such as ultrasonic sensors, laser scanners, lidar sensors, or radar sensors. The data provided by the camera 41 or the other environment sensors 42 may be used by a driver assistance system 43 as a basis for performing autonomous driving functions or driver assistance functions. Images or video recording captured by the camera may also be provided to a remote backend 60 by means of a data transmission unit 44. At the backend 60, they may be stored in a memory 61, e.g., as input data for the development of new autonomous driving functions. In order to be able to anonymize faces captured by the camera 41, the car has an apparatus 10 according to the invention for face anonymization. In the example of FIG. 4, the apparatus 10 is part of an image processing system 30 of the car. A memory 45 is available for storing data. The data exchange between the different components of the motor vehicle 40 takes place via a network 46.

Figure 5:
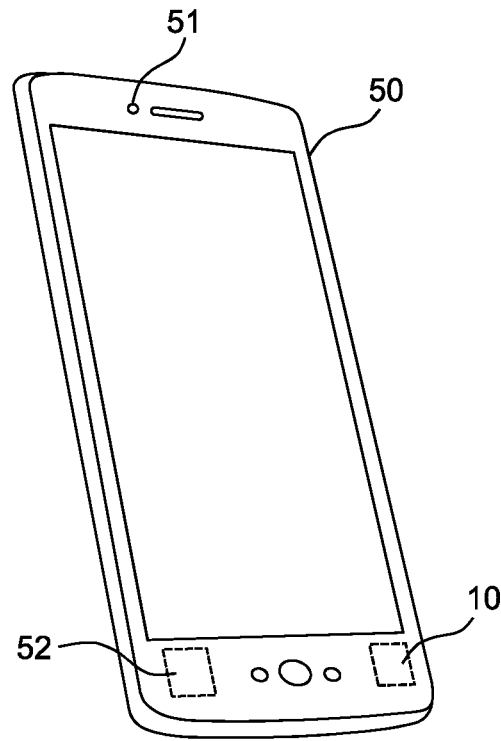
FIG. 5 schematically illustrates an electronic device in which a solution according to the invention is implemented.

FIG. 5 schematically illustrates an electronic device 50 in which a solution in accordance with the invention is implemented. In this example, the electronic device 50 is a smartphone. The smartphone has at least one camera 51 for capturing images or video recordings. The smartphone further has a processor 52 for running applications and controlling operation of the smartphone. In order to be able to anonymize faces captured by the camera 51, the processor 52 may implement a solution according to the invention for face anonymization.

In the following, further details of a solution according to the invention shall be given.

Figure 6:
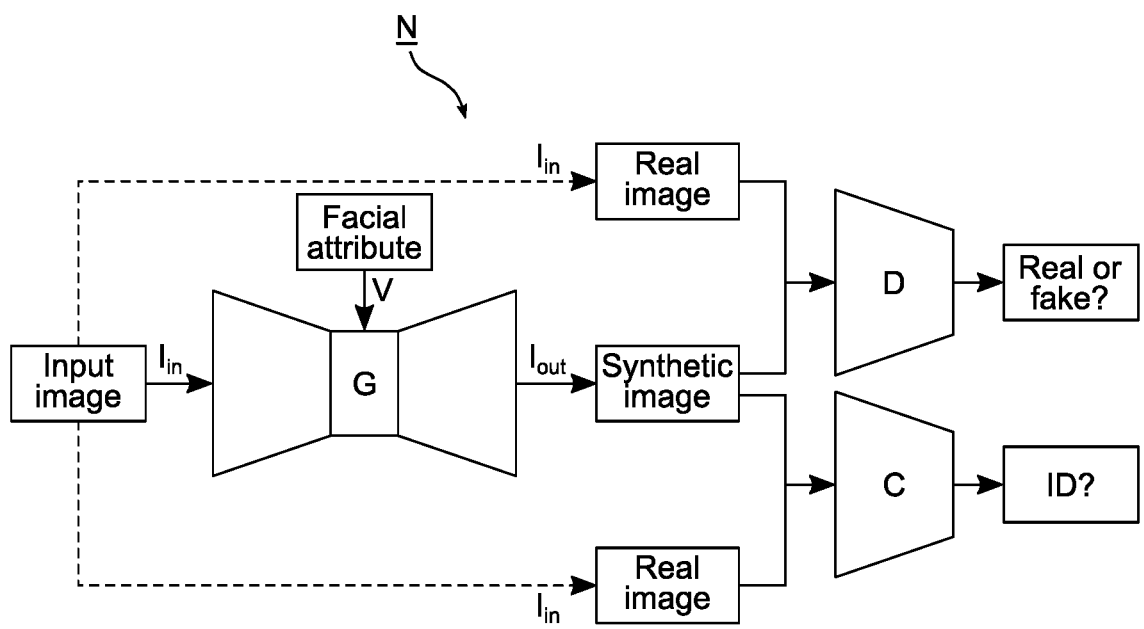
FIG. 6 shows a generative adversarial network framework for face anonymization.

FIG. 6 shows a generative adversarial network N framework for face anonymization. The generative adversarial network N consists of a generator sub-network G, a discriminator sub-network D, and an identity classifier sub-network C. The three sub-networks C, D, and G work cooperatively to realize the purpose of face anonymization.

The generator sub-network G aims to generate synthetic output images $I_{out}$ with new faces with different facial attributes based on input images $I_{in}$ and input vectors V. An exemplary architecture of the generator sub-network G is given in Table 1. Conv(a, b, k, s) and DeConv(a, b, k, s) denote a convolutional layer and a transposed convolutional layer, respectively, where a, b, k, and s denote input channels, output channels, kernel size, and stride. BN and IN denote batch normalization and instance normalization, respectively. Leaky ReLU denotes a leaky rectified linear unit. Tanh is the chosen activation function.

TABLE 1

| Layer | Layer Information |
|---|---|
| 1 | Conv(3, 64, 4, 2), BN, Leaky ReLU |
| 2 | Conv(64, 128, 4, 2), BN, Leaky ReLU |

TABLE 1-continued

| Layer | Layer Information |
|---|---|
| 3 | Conv(128, 256, 4, 2), BN, Leaky ReLU |
| 4 | Conv(256, 512, 4, 2), BN, Leaky ReLU |
| 5 | Conv(512, 1024, 4, 2), BN, Leaky ReLU |
| 6 | DeConv(1024, 512, 4, 2), BN, Leaky ReLU |
| 7 | DeConv(512, 256, 4, 2), BN, Leaky ReLU |
| 8 | DeConv(256, 128, 4, 2), BN, Leaky ReLU |
| 9 | DeConv(128, 64, 4, 2), BN, Leaky ReLU |
| 10 | DeConv(64, 3, 4, 2), Tanh |

The discriminator sub-network D aims to evaluate if generated new faces in the output images $I_{out}$ are realistic and natural. An exemplary architecture of the discriminator sub-network D is given in Table 2. Conv(a, b, k, s) denotes a convolutional layer, where a, b, k, and s denote input channels, output channels, kernel size, and stride. BN denotes batch normalization and FC(b) denotes a full connection layer with b output channels. Leaky ReLU denotes a leaky rectified linear unit.

TABLE 2

| Layer | Layer Information |
|---|---|
| 1 | Conv(3, 64, 4, 2), BN, Leaky ReLU |
| 2 | Conv(64, 128, 4, 2), BN, Leaky ReLU |
| 3 | Conv(128, 256, 4, 2), BN, Leaky ReLU |
| 4 | Conv(256, 512, 4, 2), BN, Leaky ReLU |
| 5 | Conv(512, 1024, 4, 2), BN, Leaky ReLU |
| 6-1 | FC(1024), Leaky ReLU |
| 7-1 | FC(1) |
| 6-2 | FC(1024), Leaky ReLU |
| 7-2 | FC(30) |

The identity classifier sub-network C aims to evaluate if face identities of new faces in the output images $I_{out}$ have been changed. An exemplary architecture of the identity classifier sub-network C is given in Table 3. Conv(a, b, k, s) denotes a convolutional layer, where a, b, k, and s denote input channels, output channels, kernel size, and stride. BN denotes batch normalization and FC(b) denotes a full connection layer with b output channels. Leaky ReLU denotes a leaky rectified linear unit.

TABLE 3

| Layer | Layer Information |
|---|---|
| 1 | Conv(3, 64, 3, 1), BN, ReLU |
| 2 | Conv(64, 128, 3, 1), BN, ReLU |
| 3 | Conv(128, 256, 3, 1), BN, ReLU |
| 4 | Conv(256, 512, 3, 1), BN, ReLU |
| 5 | Conv(512, 1024, 3, 1), BN, ReLU |
| 6 | FC(1024), ReLU |
| 7 | FC(1) |

As indicated before, the generative adversarial network uses four loss functions, namely an adversarial loss function, a reconstruction loss function, an attribute loss function, and an identity loss function.

The adversarial loss encourages the generator sub-network and the discriminator sub-network to compete with each other to increase their learning capacity. For a generator G, it tries to produce fake images G(x, y) that are visually similar to real images, with x being the real image and y being the facial attribute vector. For a discriminator D, it tries to distinguish the real image x and the fake image (x, y). The adversarial loss for the generator and the discriminator, respectively, thus is $$L_{G_{adv}} = \min E_{x,y}[\log(1-D(G(x, y)))] \quad (1)$$

and $$L_{D_{adv}} = \max E_x[\log(1-D(x))] + E_{x,y}[\log(1-D(G(x, y)))], \quad (2)$$

where E is the expected value.

The reconstruction loss encourages the generator sub-network to approximate the original face when all facial attributes are preserved, i.e., when anonymization is not needed:

$$L_{G_{rec}} = \|x - G(x,0)\|_1, \quad (3)$$

where $\|\cdot\|_1$ denotes the L1 norm.

The attribute loss encourages the generator sub-network to produce faces with correct facial attributes. It may be represented by the binary cross entropy losses:

$$L_{G_{att}} = \min \sum_i -y_i \log(C_D(G(x, y)_i)) - (1-y_i)\log(1 - C_D(G(x, y)_i)) \quad (4)$$

and $$L_{D_{att}} = \min \sum_i -y_i \log(C_D(x_i)) - (1-y_i)\log(1 - C_D(x_i)), \quad (5)$$

where $C_D$ is the attribute classifier in discriminator D, $y_i$ is the i-th attribute, and $G(x, y)_i$ and $x_i$ are the fake facial image and the real facial image with the i-th attribute.

The identity loss encourages the generator sub-network to produce faces with different face identity. It may likewise be represented by the binary cross entropy losses:

$$L_{G_{ID}} = \min(-p \log(C_{ID}(G(x, y))) - (1-p)\log(1 - C_D(G(x, y)))) \quad (6)$$

and $$L_{C_{ID}} = \min(-p \log(C_{ID}(x)) - (1-p)\log(1 - C_D(x))), \quad (7)$$

where $C_{ID}$ is the identity classifier in discriminator D, p is the prediction result of $C_{ID}$, and G(x,y) and x are the fake facial image and the real facial image.

The overall loss for the generator is $$L_G = L_{G_{adv}} + a_1 L_{G_{att}} + a_2 L_{G_{rec}} + a_3 L_{G_{ID}}. \quad (8)$$

The overall loss for the discriminator is $$L_D = L_{D_{adv}} + a_4 L_{D_{att}}. \quad (9)$$

The loss for the identity classifier only has the term $L_{C_{ID}}$.

Figure 7:
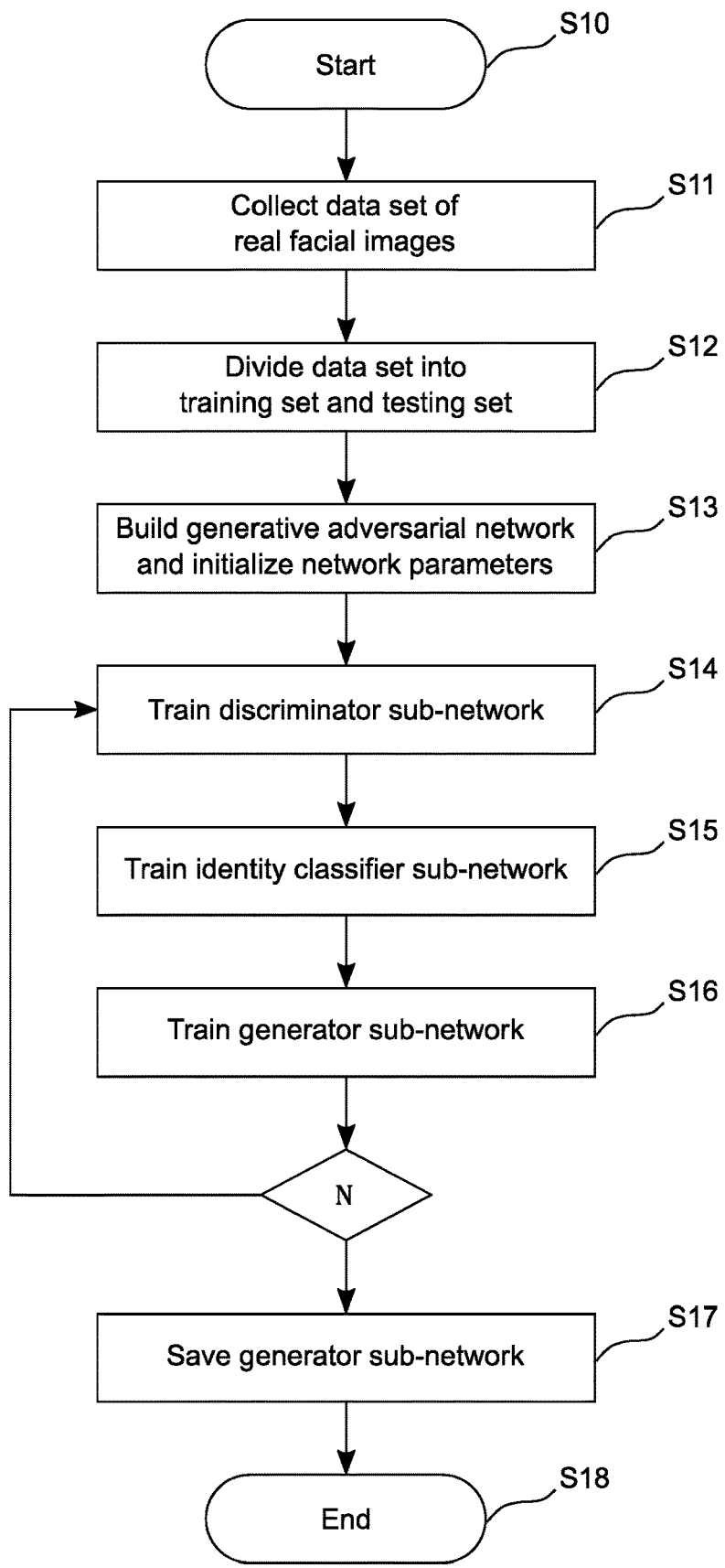
FIG. 7 shows a flowchart of generative adversarial network training.

FIG. 7 shows a flowchart of generative adversarial network training. After the start S10 of training a data set of real facial images is collected S11. The data set is then divided S12 into a training set and a testing set. Once this is done, the generative adversarial network is built S13 and the network parameters are initialized. The following steps include training S14 the discriminator sub-network, training S15 the identity classifier sub-network, and training S16 the generator sub-network. These training steps are repeated for a desired number N of iterations. At the end S18 of the training, the generator sub-network may be singled out and saved S17 for face anonymization in a testing stage.

Figure 8:
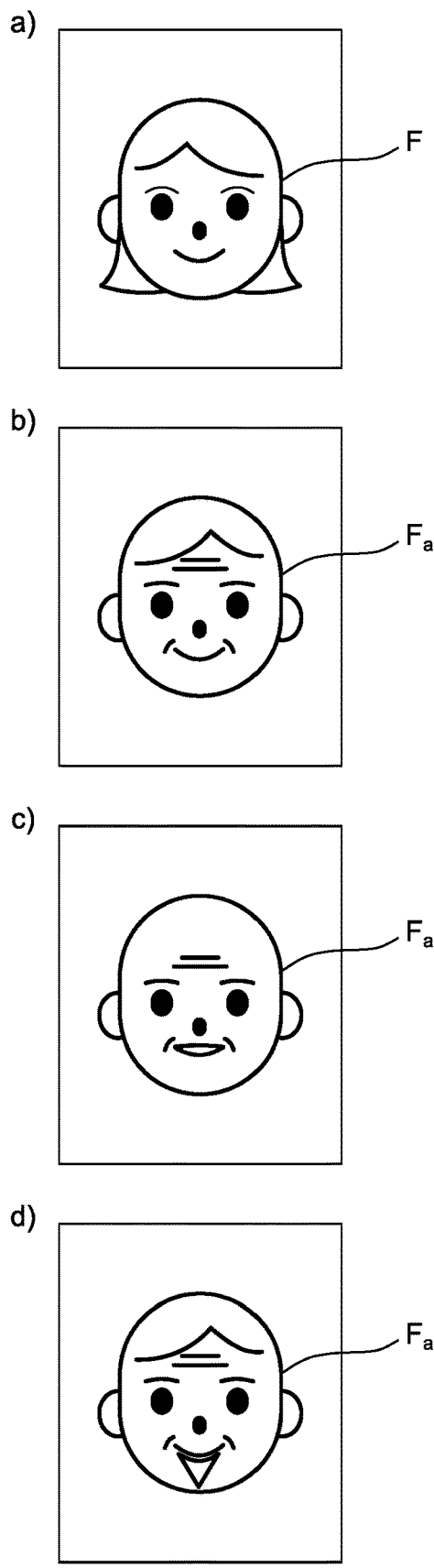
FIG. 8 shows an example of an original face and different anonymized faces generated from the original face.

FIG. 8 shows an example of an original face F and different anonymized faces $F_a$ generated from the original face F. In this example, gender, age, eyebrows, hair, baldness, mouth, mustache, and skin are considered as facial attributes. FIG. 8a shows the original face F. FIG. 8b shows an anonymized face $F_a$ with modified gender, age, eyebrows, and hair. FIG. 8c shows an anonymized face $F_a$ with modified gender, age, eyebrows, baldness, and mouth. FIG. 8d shows an anonymized face $F_a$ with modified gender, age, eyebrows, hair, and mustache.

REFERENCE NUMERALS

10 Apparatus
11 Input
12 Control module
13 Local storage unit
14 Output
15 User interface
20 Apparatus
21 Memory device
22 Processing device
23 Input
24 Output
30 Image processing system
40 Motor vehicle
41 Camera
42 Environment sensors
43 Driver assistance system
44 Data transmission unit
45 Memory
46 Network
50 Electronic device
51 Camera
52 Processor
60 Backend
61 Memory
C Identity classifier sub-network
D Discriminator sub-network
F Face
$F_a$ Anonymized face
G Generator sub-network
$I_{in}$ Input image
$I_{out}$ Output image
N Generative adversarial network
V Input vector
S1 Receive input image with face to be anonymized
S2 Receive input vector with control data
S3 Generate output image with anonymized face
S10 Start
S11 Collect data set of real facial images
S12 Divide data set into training set and testing set
S13 Build generative adversarial network and initialize network parameters
S14 Train discriminator sub-network
S15 Train identity classifier sub-network
S16 Train generator sub-network
S17 Save generator sub-network
S18 End

The invention claimed is:

1. A non-transitory computer-readable medium having stored thereon computer-executable instructions that, when executed by a processor, perform operations face anonymization, the operations comprising:
receiving an input image showing a face to be anonymized;
receiving an input vector with control data for face anonymization; and
generating by a generative adversarial network, an output image in which the face is anonymized in accordance with the control data of the input vector, wherein the generative adversarial network comprises a generator sub-network trained to generate new faces with different facial attributes, a discriminator sub-network trained to evaluate if generated new faces are realistic and natural, and an identity classifier sub-network trained to evaluate if face identities of new faces have been changed, and wherein the generator sub-network, the discriminator sub-network and the identity classifier sub-network are trained alternately and compete with each other to achieve balance of optimization.

2. The non-transitory computer-readable medium according to claim 1, wherein the input vector comprises control data for individual facial attributes.

3. The non-transitory computer-readable medium according to claim 2, wherein the control data specifies whether a facial attribute shall be modified, kept, or optionally modified.

4. The non-transitory computer-readable medium according to claim 3, wherein the control data further specifies an amount of modification of a facial attribute.

5. The non-transitory computer-readable medium according to claim 1, wherein the generative adversarial network uses an adversarial loss function, a reconstruction loss function, an attribute loss function, and an identity loss function.

6. The non-transitory computer-readable medium according to claim 1, wherein the input vector is selected based on an application scenario.

7. An apparatus for face anonymization, the apparatus comprising a generative adversarial network configured to:
receive an input image showing a face to be anonymized;
receive an input vector with control data for face anonymization; and
generate an output image in which the face is anonymized in accordance with the control data of the input vector, wherein the generative adversarial network comprises a generator sub-network trained to generate new faces with different facial attributes, a discriminator sub-network trained to evaluate if generated new faces are realistic and natural, and an identity classifier sub-network trained to evaluate if face identities of new faces have been changed, and wherein the generator sub-network, the discriminator sub-network, and the identity classifier sub-network are trained alternately and compete with each other to achieve balance of optimization.

8. The apparatus according to claim 7, wherein the input vector comprises control data for individual facial attributes.

9. The apparatus according to claim 8, wherein the control data specifies whether a facial attribute shall be modified, kept, or optionally modified.

10. The apparatus according to claim 9, wherein the control data further specifies an amount of modification of a facial attribute.

11. The apparatus according to claim 7, wherein the generative adversarial network uses an adversarial loss function, a reconstruction loss function, an attribute loss function, and an identity loss function.

12. The apparatus according to claim 7, wherein the input vector is selected based on an application scenario.

* * * * *